Figure 1:
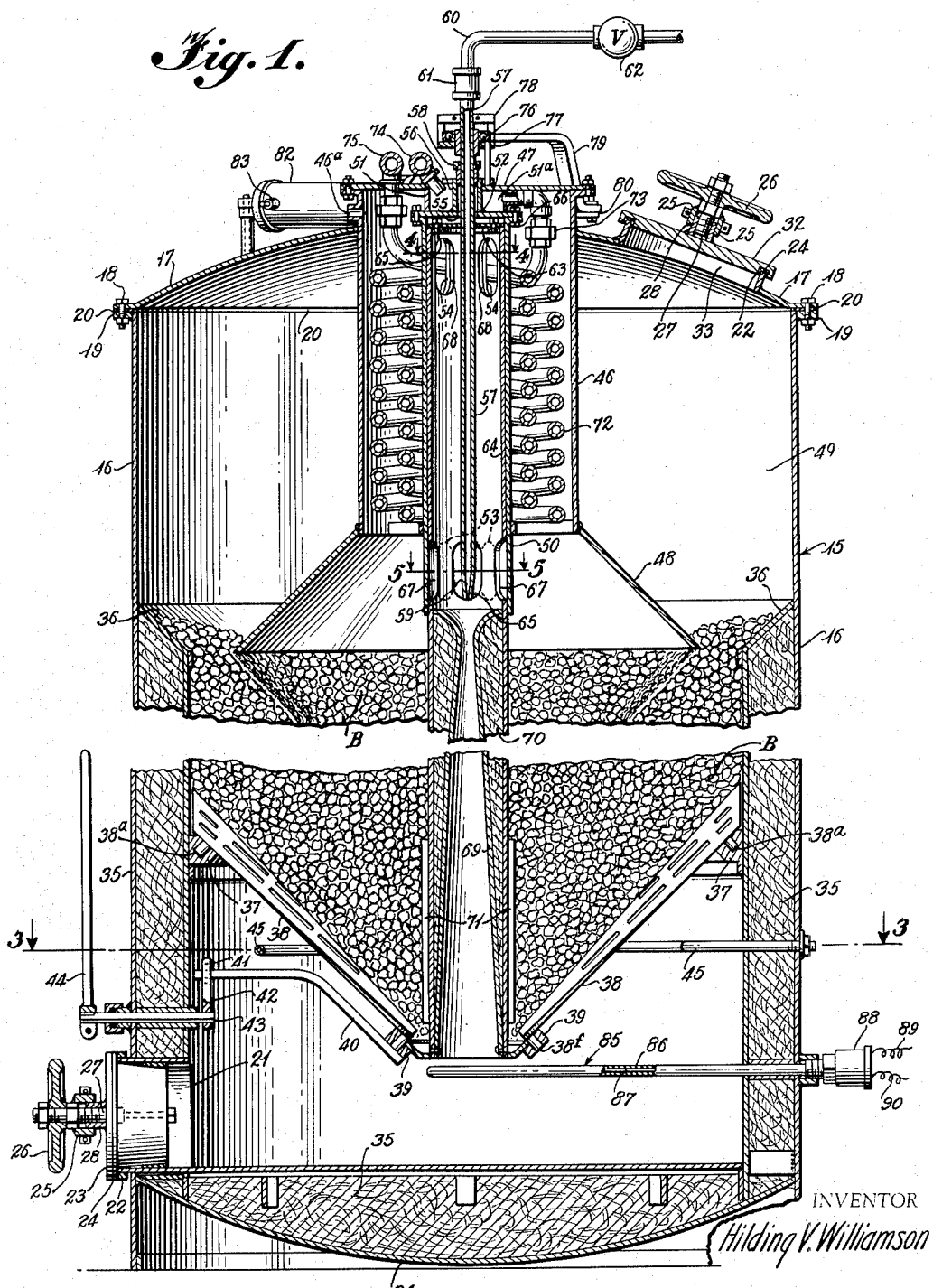

Jan. 3, 1956     H. V. WILLIAMSON     2,729,546
APPARATUS FOR PRODUCING INERT GASES
Original Filed Nov. 18, 1948     5 Sheets-Sheet 2
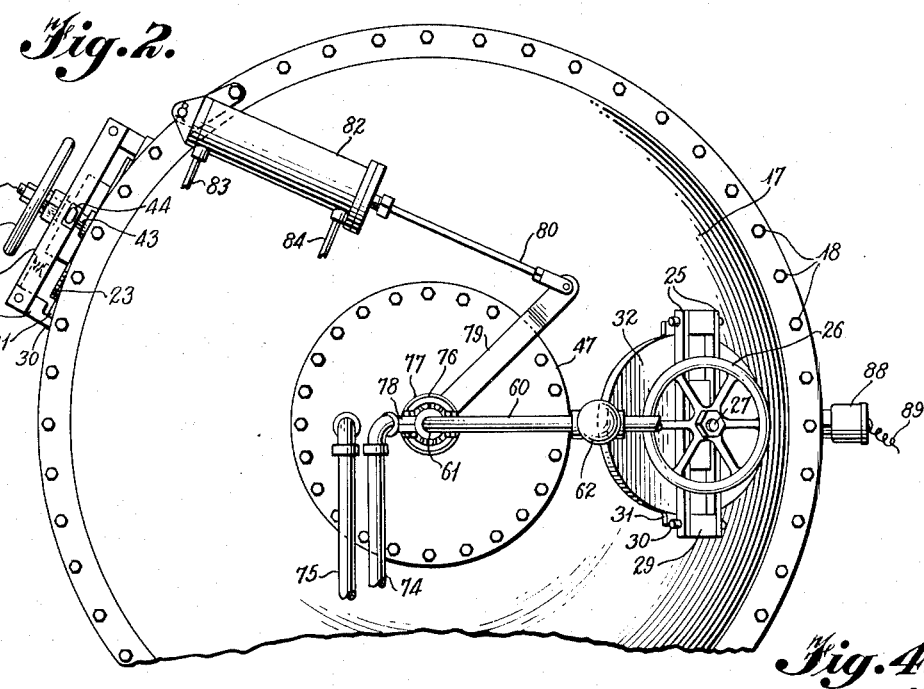
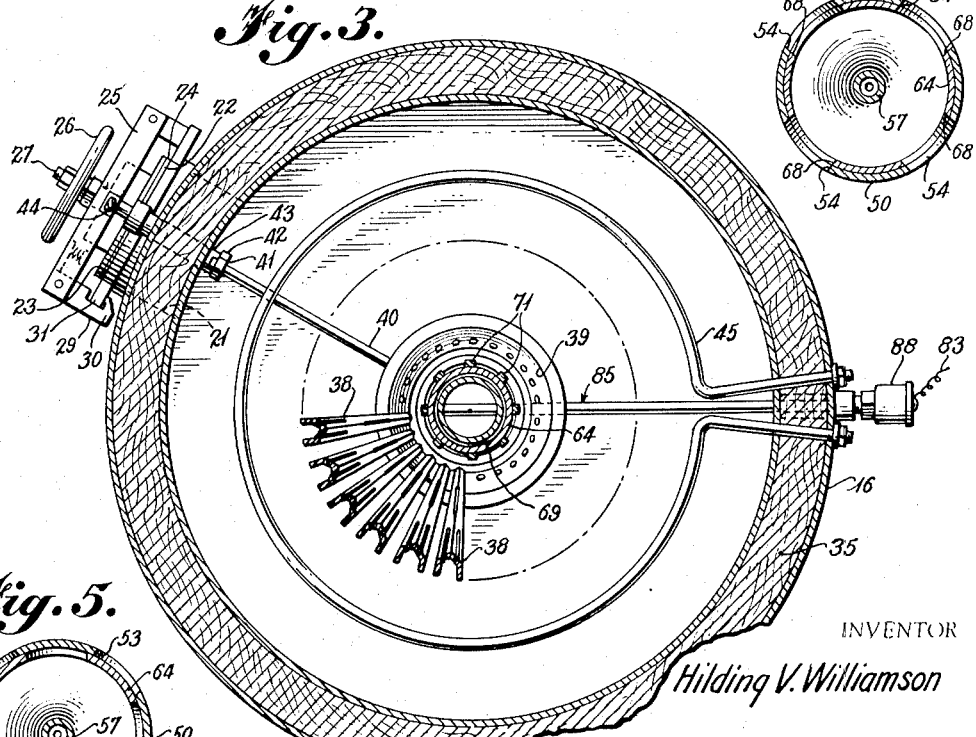
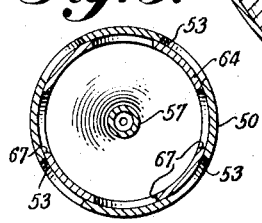
INVENTOR
Hilding V. Williamson
BY
ATTORNEY Jan. 3, 1956 H. V. WILLIAMSON 2,729,546
APPARATUS FOR PRODUCING INERT GASES
Original Filed Nov. 18, 1948 5 Sheets-Sheet 3

AIR SUPPLY

INVENTOR
Hilding V. Williamson
BY
ATTORNEY

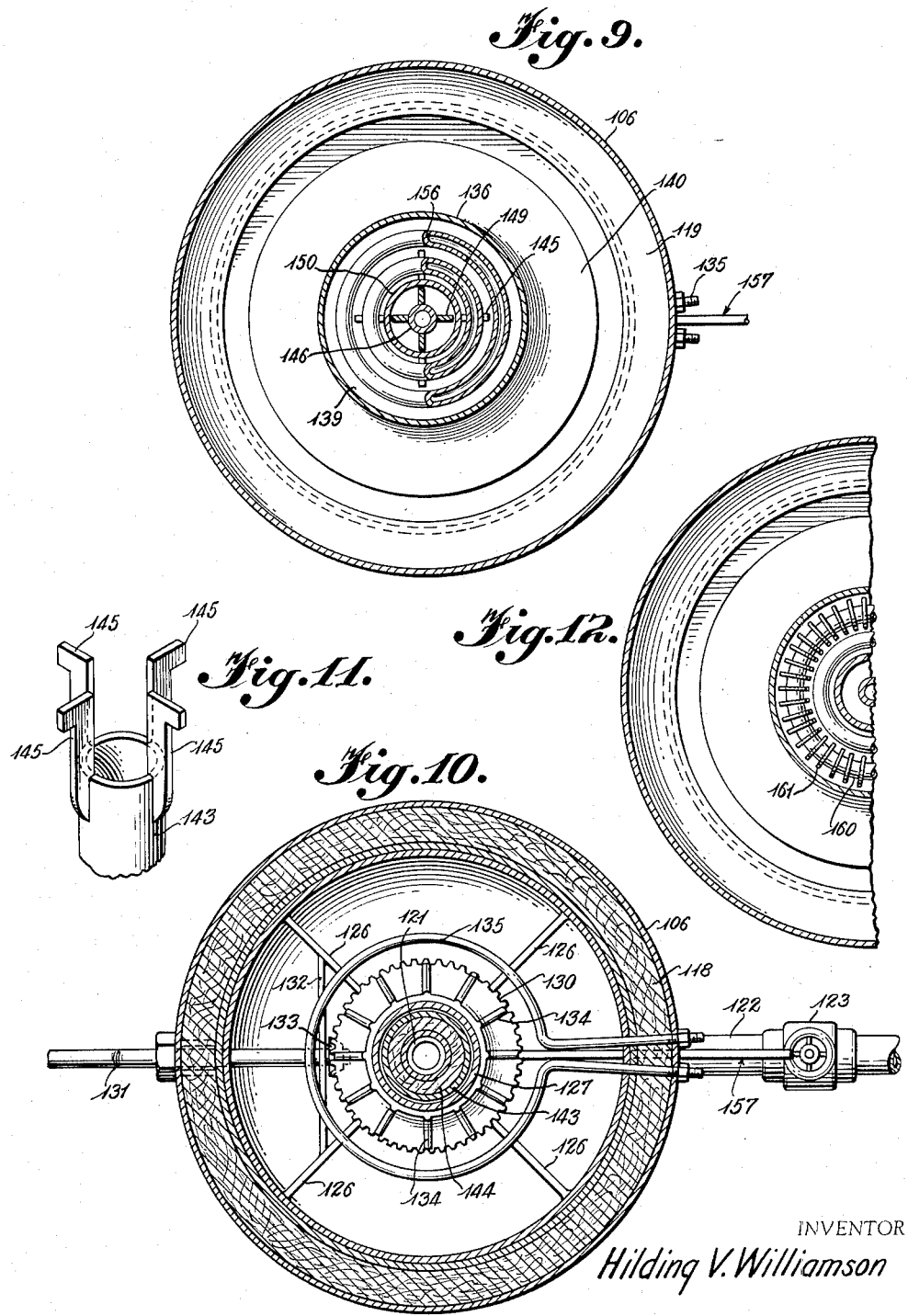

United States Patent Office 2,729,546
Patented Jan. 3, 1956

2,729,546

APPARATUS FOR PRODUCING INERT GASES

Hilding V. Williamson, Chicago, Ill., assignor to Cardox Corporation, Chicago, Ill., a corporation of Illinois Original application November 18, 1948, Serial No. 60,755, now Patent No. 2,624,711, dated January 6, 1953. Divided and this application June 9, 1952, Serial No. 292,429

10 Claims. (Cl. 23—281)

This invention relates in general to new and useful improvements in apparatus for producing a homogeneous mixture of inert gases, and more particularly to apparatus for burning a carbonaceous material in the presence of atmospheric gases to form a homogeneous mixture of gaseous products of combustion from which free oxygen and carbon monoxide have been substantially eliminated. This is a division of the application of Hilding V. Williamson, Serial No. 60,755, filed November 18, 1948, for Method and Apparatus for Producing Inert Gases, now Patent No. 2,624,711, issued January 6, 1953.

There is in modern industry, an ever increasing demand for a practical, inexpensive and relatively portable device for supplying a mixture of inert gases for use in water purification systems, inerting spaces, food preservation and other similar applications. For use in these fields, it is essential that such a mixture of gases be relatively free from oxygen, carbon monoxide, water vapor and other like impurities. For many purposes, it is essential that the carbon dioxide percentage of the gaseous mixture be maintained at a uniform, high level throughout any variations in the output of the device. And finally, the maximum output of the device should be as high as possible in accordance with its size and portability.

It is, then, the primary object of this invention to provide apparatus for combining the free oxygen of atmospheric air with carbon to form a homogeneous mixture of inert gases containing a relatively high percentage of carbon dioxide with a minimum of carbon monoxide and residual free oxygen.

A further object of the invention is to provide a device adapted for burning a solid carbonaceous material in the presence of atmospheric oxygen producing an inert gas mixture in controllable amounts; the maximum producible amount being relatively high, and the carbon dioxide content of the mixture being uniform and relatively high throughout the entire control range while the active gas impurity content is maintained at an absolute minimum.

A further object of the invention is to provide apparatus for producing a homogeneous mixture of inert gases containing a relatively high percentage of carbon dioxide and a minimum of active gas impurities by controlling the temperature and oxygen content of a gaseous mixture which is passed through a bed of solid carbonaceous material to cause the oxygen in the mixture to combine with the carbon in the material to form carbon dioxide.

Still another object of the invention is to provide apparatus for producing an inert gas mixture by passing a mixture of gases containing a controlled amount of oxygen and at a controlled temperature through a bed of carbonaceous material whereby the oxygen is combined with carbon to form carbon dioxide at a controlled reaction temperature to cause the mixture of inert gases to contain a relatively high percentage of carbon dioxide and a minimum of active gas impurities.

A still further object of the invention is to provide apparatus for producing a mixture of inert gases having a relatively high carbon dioxide content and a minimum of active gas impurities by passing a mixture of gases having a free oxygen content of approximately two to three per cent and at a temperature of 1000° F. to 1200° F. through a bed of carbonaceous material to cause the oxygen to combine with the carbon to form carbon dioxide at a reaction temperature of 1400° F. to 1600° F.

Other objects and advantages of the invention will be apparent during the course of the following description.

Figure 6:
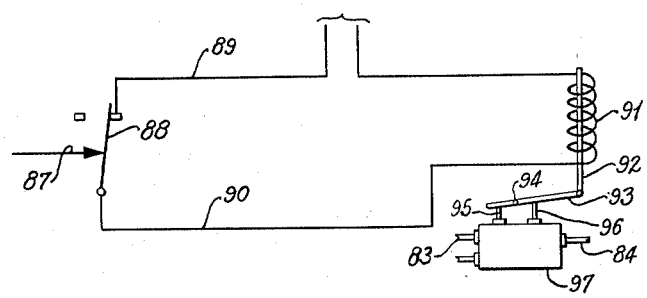
Figure 7:
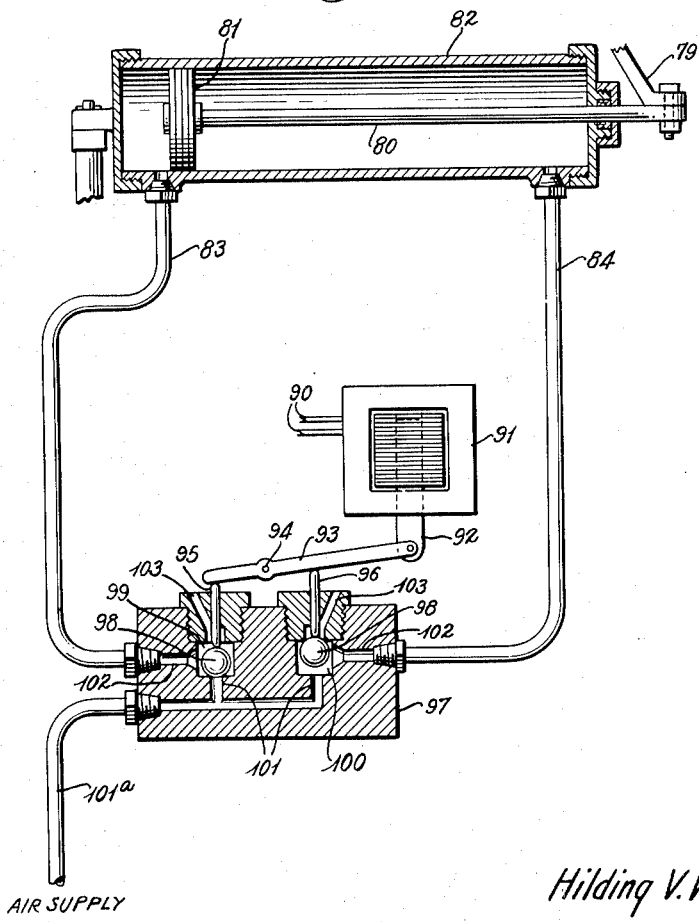
Figure 8:
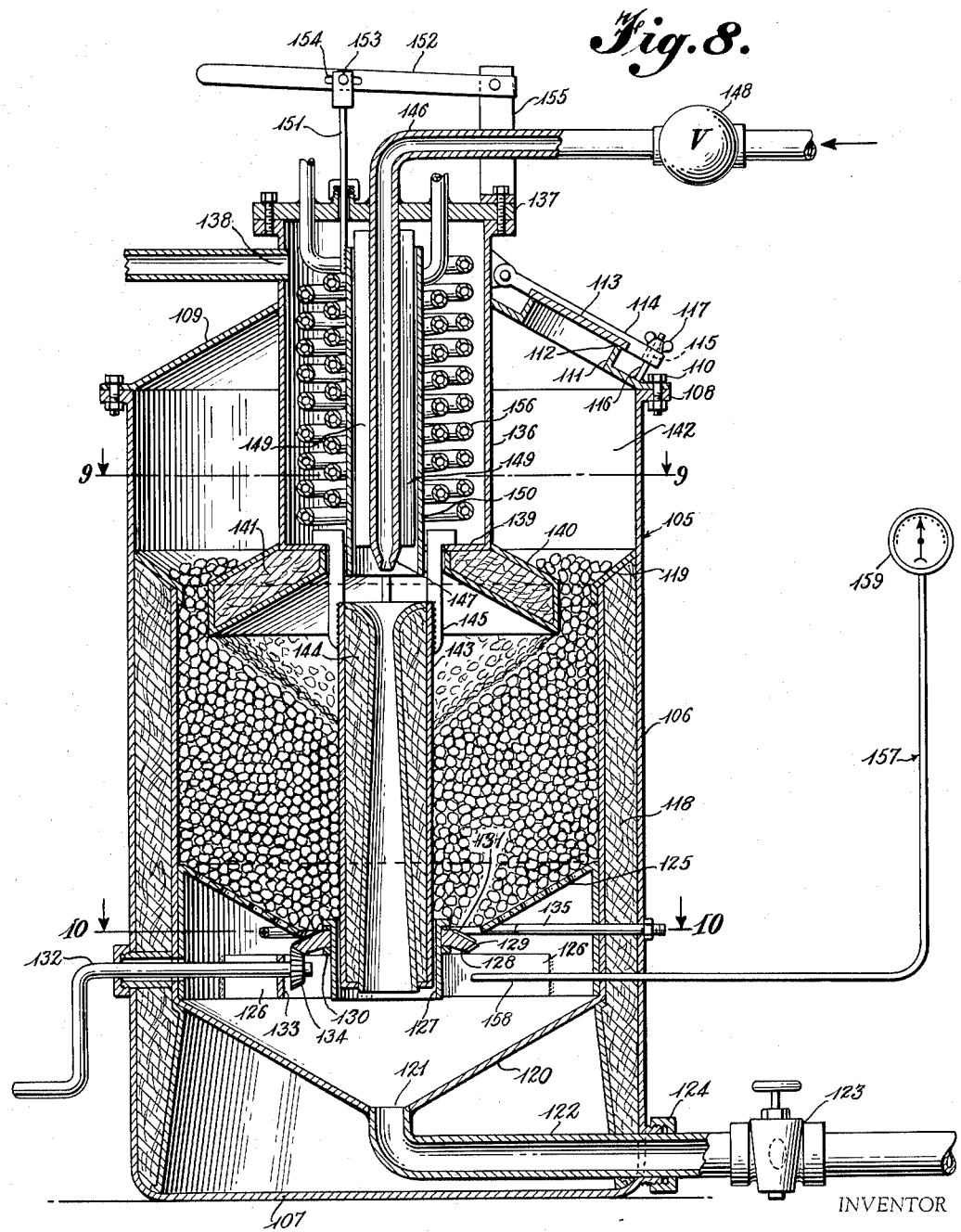

In the accompanying drawings forming a part of this specification and in which like numerals are employed to designate like parts throughout the same, Figure 1 is a vertical sectional view of an inert gas producing unit illustrating an embodiment of the invention, Figure 2 is a plan view of the unit illustrated in Fig. 1, Figure 3 is a horizontal sectional view taken on line 3—3 of Fig. 1, Figure 4 is a horizontal sectional view taken on line 4—4 of Fig. 1, Figure 5 is a horizontal sectional view taken on line 5—5 of Fig. 1, Figure 6 is a diagrammatic view of the electric circuit employed as a part of the unit illustrated in Fig. 1, Figure 7 is a schematic view of the pneumatic system that is controlled by the electric circuit illustrated in Fig. 6, Figure 8 is a vertical sectional view of a modified form of inert gas producing unit to that illustrated in Fig. 1, Figure 9 is a horizontal sectional view taken on line 9—9 of Fig. 8, Figure 10 is a horizontal sectional view taken on line 10—10 of Fig. 8, Figure 11 is a detail perspective view of the upper portion of the venturi tube illustrated in Fig. 8, and Figure 12 is a fragmentary horizontal sectional view illustrating a modification in the cooling coils of the units shown in Figs. 1 and 8.

In the drawings, wherein for the purpose of illustration, are shown the preferred embodiments of this invention, and referring first to Fig. 1, the numeral 15 designates a housing having a side wall 16 and a cover plate 17 which is connected to the side wall by the bolts 18 passing through the outer margin of the cover plate and a flange 19 on the upper margin of the side wall. A sealing member 20 is positioned between the cover plate 17 and the flange 19 to prevent pressure leakage at the connection therebetween.

The lower end portion of the side wall 16 is provided with a flanged ash removal opening 21 having a seating surface 22. A quick opening door 23, see Figs. 1, 2 and 3, is provided for the opening 21 and has a sealing member 24 for engagement with the seating surface 22. The transverse hinge members 25 are provided with a freely rotatable hand-wheel 26 having a threaded stem 27 for engagement with the internally threaded collar 28 which is connected to the outer surface of the door. The free end portions of the transverse hinge members 25 are pivotally connected to a latch bar 29 having a hooked outer end portion 30 which is engageable with the latch plate 31 when the door 23 lies across the opening 21 as illustrated in Fig. 2.

When the hooked end 30 of the latch bar is engaging the latch plate 31, the hand-wheel 26 may be rotated to cause relative axial movement between the stem 27 and the collar 28 whereby the sealing member 24 is forced into pressure sustaining engagement with the seating surface 22 and the hook 30 and latch plate 31 are maintained in their engaged position by the resulting forces therebetween.

A similarly constructed quick opening door 32 is located on the cover plate 17 to provide a pressure sustaining closure for the fuel supply opening 33 of the latter. Therefore, like reference numerals are employed to designate the corresponding parts of each door.

The lower portion of the side wall 16 and the bottom plate 34 of the housing are provided with an encased internal layer of suitable heat insulating material 35. The upper annular surface 36 of the casing of the insulating material inside the side wall 16 is sloped downwardly and inwardly relative to the side wall.

A supporting ring 37 extends circumferentially around the inner surface of the casing for the side wall insulating material 35, and is suitably connected thereto. The perforated grate bars 38 are pivotally connected to the supporting ring 37 by the pins 38a and extend downwardly and inwardly therefrom in spaced radial relationship to be pivotally connected by the pins 38b at their inner, lower end portions to the shaker ring 39. A shaker bar 40 is rigidly connected to the shaker ring 39 and extends outwardly therefrom to pass through the slot 41 in the crank arm 42. The shaft 43 of the crank arm passes through the side wall 16 and the encased insulating material 35 in a manner to prevent escape of gases, and is rigidly connected to the handle 44 as illustrated in Figs. 1 and 3.

When the handle 44 is actuated, the crank arm 42 operates to oscillate the shaker bar 40 and the shaker ring 39. This movement of the shaker ring 39 is imparted to the grate bars 38 to cause their relative movement to agitate the ash resting thereon.

A Calrod type electrical heating element 45 is positioned beneath the medial portion of the grate bars 38 and the electrical terminals thereof are passed through the encased insulating material 35 and the side wall 16 of the housing where they are sealed to prevent escape of gases from the housing.

A cylindrical stack 46 is positioned coaxially of the housing 15 in the upper portion thereof, and is provided with a sealed cover 47 which is positioned slightly above the cover plate 17. A truncated conical member 48 is connected to the lower edge of the stack 46 and extends downwardly and outwardly therefrom to terminate in spaced relation to the lower margin of the aforesaid annular surface 36 thereby forming a hopper chamber 49 bounded by the side wall 16, the cover plate 17, the stack 46, the conical member 48, and the annular surface 36. The opening 33 provides an inlet to the chamber 49, and the space between the conical member 48 and the annular surface 36 provides an annular discharge opening above the outer portion of the grate bars 38.

The space below the stack 46 and the conical member 48 and above the grate bars 38 serves as a combustion chamber, receiving its fuel supply from the hopper chamber 49 through the discharge opening thereof.

The stack 46 is provided with a discharge opening 46a located between its cover 47 and the cover plate 17 of the housing for withdrawing gaseous products of combustion from the housing.

A cylindrical tube 50 is rigidly connected to the inner surface of the stack cover 47 by the flanged ring 51 to form a cooling chamber 51a between the cap 52 for the tube 50 and the cover 47. The tube 50 extends downwardly through the stack 46 to a point slightly below the lower margin of the latter. This tube is provided with four openings 53 at equally spaced circumferential intervals around its lower end portion. The upper end portion of the tube 50 is provided with a similar series of four equally spaced openings 54 that are longitudinally alined with the lower openings 53, as illustrated in Figs. 1, 4 and 5.

The cap 52 is provided with a central opening 55 surrounded by a cylindrical projection 56 which extends above the stack cover 47 to receive the air inlet pipe 57 through the packing gland 58. The air inlet pipe passes through the cap 52 and centrally of the tube 50 to terminate in a flow restricting nozzle 59 near the lower openings 53.

The upper end portion of the air inlet pipe 57 is connected to the compressed air supply pipe 60 through the swivel joint 61 and valve 62 controls the flow of compressed air through the pipe 57.

A plate 63 is welded or otherwise connected to the air inlet pipe 57 beneath and closely adjacent to the cap 52. An aspirator tube 64, having an internally flanged upper end portion 65, is connected to the plate 63 by the bolts 66. The aspirator tube 64 is concentrically positioned within the tube 50, with a minimum clearance to allow relative rotation therebetween, and extends downwardly through the shaker ring 39 to the space below the grate bars 38. A series of four equally spaced openings 67 are located circumferentially at the medial portion of the aspirator tube 64 and a similar series of four openings 68 are located at the upper end portion of this tube. The upper openings 68 are displaced angularly 45 degrees with respect to the lower openings 67, as illustrated in Figs. 1, 4 and 5. The location of the openings 67 and 68 in the aspirator tube 64 and the openings 53 and 54 in the tube 50 are such that the aspirator tube may be rotated to radially aline the openings 67 and 53 at which time the openings 68 are disalined radially with the upper openings 54. The openings 68 and 54 may also be radially alined by rotation of the aspirator tube 64, but when so alined the openings 67 and 53 are disalined radially.

It will be seen that the above discussed openings in the tubes 50 and 64 are so arranged that the tubes cooperate by relative rotation to function as a selector valve for controlling the path of flow of the gases.

A venturi type flow nozzle 69 is positioned within the lower portion of the aspirator tube 64 so that the flow restricting air nozzle 59 points into the converging inlet of the venturi, and the space between the venturi 69 and the aspirator tube 64 is filled with a suitable heat insulating material 70.

Ash agitating fins 71 are connected to the outer surface of the lower end portion of the aspirator tube 64 and extend longitudinally thereof.

A double layer cooling coil 72 is positioned within the stack 46 outwardly of the tube 50. The upper end portion 73 of the outer layer of the coil is connected to the cooling chamber 51a so that a continuous flow path for the water, or other cooling medium, is formed. This flow path includes the cooling chamber 51a and cooling coil 72, having an inlet 74 into the cooling chamber, and an outlet 75 at the upper end of the inner layer of the coil.

By referring to Figs. 1, 2 and 7, it will be seen that the air inlet pipe 57 is vertically supported for rotary movement by the ball type thrust bearing 76 resting on the support 77 and carrying the split clamp 78 which is rigidly connected to the pipe. An operating lever 79 is rigidly connected to the split clamp 78 and pivotally connected to the rod 80 of the double acting piston 81. The piston 81 is movably mounted in the cylinder 82 which is pivotally mounted on the cover plate 17 and provided with pressure supply lines 83 and 84.

Referring now to Figs. 1, 6 and 7 for a detailed description of an automatic temperature control system for the unit, the temperature responsive control element 85, located in the space below the grate bars 38, is formed of an outer tubular member 86 and an internal rod 87 having a low thermal coefficient of expansion relative to the tube 86. One end portion of the tube 86 is positioned directly beneath the outlet of the venturi 67, and the inner rod 87 is fastened to the tube at this end. The other end of the tube 86 is projected through the side wall 16 in sealing engagement therewith, and the corresponding end portion of the rod 87 projects from the end of the tube. Expansion and contraction of the tube 86 will therefore cause the projecting end portion of the tube 87 to move inwardly and outwardly, respectively, relative to the side wall 16. This movement of the rod 87 serves to operate a switch 88 to open and close, respectively, the electrical circuit through the wires 89 and 90.

As is illustrated in Fig. 6, the wire 89 is connected to one side of an electric supply source, not shown, and the wire 90 is connected through the coil of the solenoid 91 to the other side of the supply source.

The movable armature 92 of the solenoid is pivotally connected to the valve operating lever 93 which is mounted for pivotal movement above the pin 94. A pair of valve operating rods 95 and 96 are slideably mounted in the valve body 97 in such a manner that the outer end portions of the rods may freely engage the operating lever 93 on opposite sides of the pin 94.

The inner end portions of the rods 95 and 96 are adapted to freely engage the movable balls 98 located, respectively, within the chambers 99 and 100. Each of chambers 99 and 100 is provided with an inlet 101, an outlet 102 and a vent 103. Movement of the valve operating rods 95 and 96 in their respective chambers moves one ball 98 to close the inlet 101 of one of the chambers and simultaneously releases the ball 98 in the other chamber to permit pressure air to flow through its inlet 101. Further, the vents 103 of the chambers are so positioned that movement of the balls 98 toward or away from the inlets 101 causes the vents to be closed and opened, respectively, as the inlets 101 are opened and closed. The outlets 102 remain open at all times, and are connected to the pressure supply lines 83 and 84 leading to the cylinder 82.

The inlet openings 101 of the chambers 99 and 100 are connected by the pipe 101a to a source of supply of compressed air, not shown, which may be the same source as that to which the compressed air supply pipe 60 is connected.

In operation, the weight of the solenoid armature 92, supplemented by a spring if necessary, forces the lever 93 into its depressed position when switch 88 is open and no current is flowing through the solenoid 91. In this position the compressed air admitted to the chamber 99 is directed through its outlet 102 and the pressure supply line 83 to force the piston 81 to the opposite end of the cylinder 82, as viewed in Fig. 7. The air which is displaced from the cylinder 82 is exhausted through the pressure supply line 84 and the outlet 102 of the chamber 100 to be vented through the now open vent 103 in the chamber 100. The inlet 101 of the chamber 100 is closed to prevent escape of the compressed air through the open vent 103.

When the solenoid 91 is energized, as illustrated in Fig. 7, the lever 93 is raised by the solenoid armature 92. In its raised position, the lever 93 reverses the operating conditions of the chambers 99 and 100. Compressed air is admitted to the chamber 100 and passes through supply line 84 to enter the cylinder 82 to force the piston 81 to the opposite end thereof and to exhaust the air on the opposite side of the piston 80 through the line 83 and the vent 103 in the chamber 99.

Referring now to Figs. 1 through 7 for a description of the operation of the above described unit, the hopper chamber 49 is supplied with coke through the opening 33 until the coke passing through the bottom discharge opening onto the grates 38 has formed a bed B of sufficient depth to prevent further discharge. A reserve supply of coke, preferably, is maintained in the hopper chamber. The door 32 is then closed and, with the hooked end 30 of the latch bar 29 engaging the latch plate 31, the hand-wheel 26 is rotated to force the sealing member 24 into sealing engagement with the seating surface 22. The door 23 is similarly closed and sealed to prevent escape of gases through the ash removal opening 21.

The heating element 45 is energized for a sufficient length of time to raise the temperature of the coke bed B to approximately 1000° F. at which point compressed air from a suitable supply source is admitted at a constant pressure through the valve 62 in the supply line 60 to the air inlet pipe 57. The heating element is then deenergized.

The compressed air entering the air inlet pipe 57 is directed downwardly from the flow restricting nozzle 59 as a high velocity jet, and enters the venturi 69. The velocity of the air discharged by the nozzle 59 is increased and its static pressure is decreased so as to create a pressure drop of from five to ten pounds per square inch in the passage of the air from the nozzle 59 through the throat of the venturi. This pressure drop creates an aspirator effect so that gases are drawn through either the openings 67 and 53, communicating with the combustion chamber, or through the openings 68 and 54, communicating with the upper portion of the stack 46, depending upon the relative positions of the tube 50 and the aspirator tube 64 and the openings that are radially alined. The gases passing through the alined openings are entrained in the air stream at a ratio of from six to ten volumes of entrained gases for each volume of air.

The air and entrained gases are thoroughly mixed during their passage through the venturi 69, and are delivered to the space below the grate bars 38. From this space the air and gas mixture flows upwardly into the fuel bed B through the perforations in and the spaces between the grates 38. The oxygen content of the mixture of air and gases will vary from approximately three per cent, when the ratio of entrained gases to air is six to one, to approximately two per cent when the ratio is ten to one.

The temperature of the mixture depends primarily upon the temperature of the entrained gases, and is controlled by the temperature responsive control element 85 to within a range of 1000° F. to 1200° F. The mode of operation of the temperature control system is as follows:

When the temperature of the mixture of air and entrained gases drops to 1000° F., the gaseous mixture issuing from the venturi 69 and contacting the element 85 will cause the tube 86 to contract sufficiently to move the rod 87 outwardly to close the switch 88. The circuit through the solenoid 91 is then closed by the switch 88 and energization of the solenoids causes operation of the valve 97 to bring about movement of the piston 81 to the left-hand end portion of the cylinder 82, as shown in Fig. 7.

Fig. 2 illustrates that this movement of the piston 81, and its attached piston rod 80, will cause the operating lever 79 to pivot in a counter-clockwise direction, whereby the air inlet tube 57 and its attached aspirator tube 64 will be rotated in the same direction. The length of the piston stroke is such that rotation of the aspirator tube 64 is limited to the 45 degrees necessary to place the openings 67 in the aspirator tube in alinement with the openings 53 in the tube 50, and to disaline the openings 54 and 68 at the upper end portions of the tubes 50 and 64.

The entrained gases are, therefore, drawn from the combustion chamber directly above the fuel bed B where their temperature is at or near the maximum. This results in an increase in the temperature of the mixture of air and entrained gases contacting the element 85 so that the tubular member 86 will expand to retract the rod 87 and open the switch 88 in the circuit through the solenoid 91.

As the solenoid 91 is deenergized, valve 97 is operated to cause the piston 81 and its piston rod 80 to move to the right of Fig. 7, as herebefore discussed.

Movement of the piston rod 80 in this direction will pivot the operating lever 79 and rotate the attached air inlet pipe 57 in a clockwise direction to rotate the aspirator tube 64 to the position where the openings 54 and 68 are alined and the openings 53 and 67 disalined.

The entrained gases will then be drawn from the upper portion of the stack 46 after having passed in contact with the cooling coil 72. The entrained gases are, therefore, at a lower temperature than those gases directly above the fuel bed B, and the temperature of the mixture of air and entrained gases will accordingly be reduced.

To summarize the above description of the mode of operation, the mixture of air and entrained gases is delivered to the bottom of the fuel bed B at a temperature of 1000° F. to 1200° F. and with an oxygen content of from two to three per cent, where the oxygen supports combustion of the coke.

During the passage of the mixture through the coke bed B, most of the oxygen is combined with the carbon in the coke to form carbon dioxide and the temperature increases approximately 200° F. for each one per cent of oxygen contained in the mixture. The temperature of the gaseous products of combustion leaving the top of the fuel bed B will, therefore, ordinarily range from 1400° F. to 1600° F.

A portion of the gaseous products of combustion rising from the fuel bed B are then entrained and recycled with the incoming air to make the process continuous and complete. The recycled gases may contain a small amount of carbon monoxide due to incomplete combustion in the fuel bed B, but the temperature of the air and recycled gas mixture is such that substantially all of the carbon monoxide combines with oxygen in the air before reentering the fuel bed B.

The inert gas mixture, which is discharged from the unit through the discharge opening 46a in the stack 46, consists primarily of inert atmospheric gases and from nineteen to twenty per cent carbon dioxide with less than two-tenths per cent free oxygen and less than five-tenths per cent carbon monoxide. Variations in the amount of constant pressure air supplied will not appreciably affect the consistency of the discharged gases.

The maximum output is increased by operating the unit with internal pressure of up to twelve pounds per square inch, gage. As the internal pressure is increased, the velocity of the recycled gases and the air passing through the fuel bed B will be reduced to extend the length of time during which combustion may take place.

During operation of the unit, the grate handle 44 may be actuated to move the grate bars 38 whereby the ashes will filter through the bars and collect in the bottom of the housing 15. Operation of the grate bars 38 will also facilitate settling of the fuel bed B as combustion occurs to allow fuel to feed into the combustion chamber from the hopper chamber 49. The fins 71 on the aspirator tube 64 act to further agitate the fuel bed B when the aspirator tube is rotated to control the temperature of the mixture of air and entrained gases. The ashes collected in the bottom of the housing 16 are removed from the housing through the ash removal opening 21.

Referring now to Figs. 8 through 11, wherein is illustrated a modification of the embodiment of the invention illustrated in Fig. 1, the number 105 designates a housing having a side wall 106 and an integral bottom plate 107. The upper end portion of the side wall 106 is flanged outwardly to provide a seating surface 108 for the cover plate 109. The cover plate 109 is connected to the upper end portion of the side wall 106 by the bolts 110 in a manner to prevent the leakage of gases therebetween.

The cover plate 109 is provided with a flanged opening 111 having a seating surface 112. A door 113 is hinged for movement to close the opening 111, and is provided with a transverse latch bar 114 having a slotted end portion 115 for receiving the stud 116 so that the door 113 may be locked in its closed position by the wing nut 117.

The lower portion of the side wall 106 is provided with an encased internal layer of suitable heat insulating material 118. The upper annular surface 119 of the casing of the insulating material inside the side wall 106 is sloped downwardly and inwardly relative to the side wall.

An ash collecting hopper 120 is positioned in the lower portion of the housing 105 so that its downwardly inclined surface extends from the casing of the insulating material 118 to a centrally located opening 121. An ash blow-off pipe 122 provides a passageway from the opening 121 to a valve 123 outside the housing 105. The point at which the ash blow-off pipe 122 passes through the lower end portion of the side wall 106 is provided with a sealing device 124 to prevent escape of gases from the housing 105.

A perforated conical grate 125 is positioned in the lower portion of the housing 105 where it is connected to and extends downwardly and inwardly from the casing of the insulating material 118 in spaced relation to the ash collecting hopper 120. The lower portion of the grate 125 is provided with a centrally located opening.

As illustrated in Figs. 8 and 10, a series of four equally spaced support bars 126 extend radially inwardly from the casing of the insulating material 118 below the grate 125 to receive the cylindrical shaker support 127 which is concentrically located with respect to the axis of the housing 105 and extends upwardly through the opening in the grate 125. The upper end portion of the shaker support 127 is flanged outwardly. An annular shaker ring 128, having a toothed, beveled outer edge 129, is held in position around the shaker support by the ring 130. The shaker ring 128 is thereby rotatable about the shaker support, and is provided with a series of equally spaced, radially extending ribs 131 on the upper surface thereof.

A shaker crank 132 extends through the side wall 106 of the housing 105 in such a manner as to prevent escape of gases from the housing, and is supported near its inner end portion by the transverse supporting member 133 which is connected between adjacent support bars 126. The inner end portion of the shaker crank 131 is provided with a beveled gear 134 for engagement with the toothed outer edge 129 of the shaker ring 128.

A Calrod type electrical heating element 135 is positioned beneath the medial portion of the grate 125 and has electrical terminals passing through the encased insulating material 118 and the side wall 106 of the housing where they are sealed to prevent escape of gases from the housing 105.

A cylindrical stack 136 is positioned coaxially of the housing 105 in the upper portion thereof, and is provided with a sealed cover 137 which is positioned above the cover plate 109. The stack 136 is provided with a discharge opening 138 located between its cover 137 and the cover plate 109 of the housing for withdrawing gases from the stack. A flange 139 extends inwardly from the lower end portion of the stack 136 to provide a centrally located circular opening in the bottom of the stack.

A hollow truncated conical member 140, filled with a suitable heat insulating material 141, is connected to and extends downwardly and outwardly from the flange 139 to terminate in spaced relation to the inclined annular surface 119 thereby forming a hopper chamber 142 bounded by the side wall 106, the cover plate 109, the stack 136, the conical member 140, and the annular surface 119. The opening 111 provides an inlet to the chamber 142 and the space between the conical member 140 and the annular surface 119 provides an annular discharge opening above the outer portion of the grate 125.

The space below the conical member 140 and above the grate 125 serves as a combustion chamber, receiving its fuel supply from the hopper chamber 142 through its discharge opening.

An encased venturi tube 143, having heat insulating material 144, is suspended from the flanged surface 139 by the four equally spaced fingers 145 to extend downwardly through the cylindrical shaker support 127 to the space below the grate 125.

The stack cover 137 is provided with a central opening for receiving the air inlet pipe 146 which passes through the opening in sealing engagement therewith and extends vertically downwardly through the stack 136 to terminate in a flow restricting nozzle 147 slightly above and concentric with the inlet of the venturi tube 143. The valve 148 located in the air inlet pipe 146 acts to regulate the flow of air through the pipe 146. The portion of the air inlet pipe 146 within the housing 105 is provided with a series of four equally spaced fins 149 extending longitudinally thereof.

A movable cylindrical tube 150, positioned between the inlet of the venturi tube 143 and the cover 137, is of such a length as to permit vertical movement between the venturi and cover. The tube 150 is guided in its vertical movements by the fins 149 contacting its inner surface, and the spaced fingers 145 contacting the lower end portion of its outer surface. An operating rod 151 is fastened to the upper end portion of the tube 150 and extends vertically therefrom through the stack cover 137 in such a manner as to permit vertical movement of the rod and prevent escape of gases from the housing 105. The upper end portion of the operating rod 151 is pivotally connected to the operating handle 152 by the pin 153 passing through the slot 154 in the latter. One end portion of the operating handle 152 is pivotally connected to the vertical post 155 which is mounted on the stack cover 137.

It will be seen that when the operating lever 152 is raised to its uppermost position, the operating rod 151 will lift the tube 150 so that its upper end portion will contact the stack cover 137. When the tube 150 is thus contacting the inner surface of the cover 137, the lower end portion of the tube 150 will lie in spaced relation to the inlet of the venturi 143. When the operating lever is moved to its lowermost position, the lower end portion of the tube 150 will contact the venturi tube 143 and the upper end portion of the tube will lie in spaced relation to the stack cover 137. Intermediate positions of the operating handle 152, between its uppermost and lowermost positions, will provide for locations of the tube 150 to vary the space between the lower end portion of the tube and the inlet of the venturi and the upper end portion of the tube and the stack cover 137. The tube 150, therefore, acts as a selector valve for controlling the flow of gas into the venturi through the spaces at either the bottom or the top end portion of the tube.

As illustrated in Figs. 8 and 9, a double layer cooling coil 156 is positioned within the stack 136 outwardly of the tube 150. The upper end portions of the inner and outer layers of the coil are extended through the stack cover 137 to provide the inlet and outlet for the water or other cooling medium which is to flow through the coil. The lower end portions of the inner and outer layers are connected to form a continuous flow path.

A pyrometer 157 is mounted on the housing so that the temperature responsive portion 158 thereof is located beneath the grate 125 and extends outwardly through the encased insulating material 118 and the side wall 106 in such a manner as to prevent the escape of gases from the housing 105. The indicator dial 159 of the pyrometer is conveniently located outside the housing 105.

The operation of the modified unit illustrated in Fig. 8 is the same as that of the modification illustrated in Fig. 1 herebefore disclosed, with the exception of the manually operated temperature control system and the manner in which ashes are removed from the lower portion of the housing. The operation of the unit illustrated in Fig. 8 will, therefore, be discussed at this point only insofar as the temperature control and ash removal systems are concerned.

It will be recalled, that the temperature of the mixture of air and entrained gases in the space below the grate 125 is to be maintained within the range of 1000° F. to 1200° F. The portion 158 of the pyrometer 157 responds to changes in the temperature of the surrounding gas as indicated by the dial 159. The operating lever 152, therefore, may be manually actuated for adjusting the tube 150 to regulate the temperature of the entrained gases when necessary to properly maintain the temperature within the desired range as indicated by the pyrometer indicating dial 152.

The mode of operation of the tube 150 in controlling the temperature of the gas and air mixture will now be described.

When the temperature indicated on the dial 159 rises to approximately 1200° F. the operating handle 152 should be depressed to place the lower end portion of the tube 150 in contact with the inlet of the venturi 143. In this position, the tube 150 provides a flow path for the gases to be entrained in the venturi through the stack 136 in contact with the cooling coil 156, then downwardly along the inner side of the tube 150. The passage of the entrained gases in contact with the coil 156 cools the gases sufficiently to reduce the temperature of the mixture of the air and entrained gases so that their temperature will drop.

When the temperature indicated by the pyrometer dial 159 drops to 1000° F. the operating handle 152 should be lifted to cause the upper end portion of the tube 150 to contact the inner surface of the stack cover 137. In this position the aforementioned flow path to the venturi 143 is closed and the entrained gases will be drawn directly from the combustion chamber through the space between the lower end portion of the tube 150 and the inlet of the venturi 143. The gases in the combustion chamber are at a higher temperature than those passing over the cooling coil 156, and the temperature of the air and entrained gases will, therefore, be increased to prevent a temperature drop to below the prescribed limits.

It will be appreciated that adjustment of the operating lever 152 to a position intermediate to its uppermost and lowermost positions will adjust the tube 150 to provide for the flow of entrained gases through both the space below the lower end portion of the tube 150 and the space above the upper end portion of the tube 150. Part of the entrained gases under these circumstances will be cooled so that a balanced condition may be reached where further adjustments of the tube will be slight and infrequently required.

The ashes which are collected in the ash collecting hopper 120 may be periodically removed during operation of the unit by opening the valve 123 whereby the pressure within the unit will cause the ashes to be blown through the opening 121 and the pipe 122 to be discharged from the unit.

Fig. 12 illustrates a modified cooling coil 160 which may replace the cooling coil 156 of the unit illustrated in Fig. 8, or the cooling coil 72 of the unit illustrated in Fig. 1. The outer layer of the coil 160 is provided with a series of discs 161. These discs 161, therefore, provide a greatly increased surface area for heat absorption from the gases passing thereover, and act to conduct the heat to the cooling medium which is flowing through the coil 160.

It is to be understood that the forms of this invention herewith shown and described are to be taken as preferred examples of the same, and that various changes in the shape, size, and arrangement of parts may be resorted to without departing from the spirit of the invention, or the scope of the subjoined claims.

Having thus described the invention, I claim:

1. A device for producing inert gas, comprising a housing having a gas collecting chamber therein, a partition mounted in said housing for supporting a fuel bed below said gas collecting chamber and in spaced relationship with the bottom of the housing, means providing a confined passageway between the gas collecting chamber and the space below said fuel supporting partition, said passageway having openings into said gas collecting chamber at different distances from said fuel bed, means for introducing a pressure air stream into said passageway in a direction to entrain a portion of the gaseous products of combustion from said collecting chamber through said openings and to cause said air and said entrained gases to traverse said passageway for delivery to the fuel bed through said partition, means for conversely varying the size of said openings to control the portion of the collecting chamber from which the gaseous products of combustion are entrained into said passageway and to thereby regulate the temperature of the gases entrained in said air stream, and means for releasing a portion of the gases in said collecting chamber from said housing.

2. A device for producing an inert gas mixture, comprising a housing having a gas collecting chamber therein, a partition mounted in said housing for supporting a fuel bed below said gas collecting chamber and in spaced relationship with the bottom of the housing, aspirator means for entraining gases from spaced portions of said collecting chamber in an air stream and for introducing said air and entrained gases to the spaces below said partition for delivery to said fuel bed through the partition, means for alternately varying the proportions of the gases entrained from said spaced portions of the collecting chamber to control the temperature of the gases entrained in said air stream, and means for removing a portion of the gases in the upper portion of said chamber from said housing.

3. A device for producing an inert gas mixture, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, cooling means within said exhaust stack, means providing a confined passageway between the gas collecting chamber and the space below said fuel supporting partition, means for directing a pressure air stream into the upper end portion of said passageway to entrain gaseous products of combustion for delivery to the space below said partition, means providing a flow path from said collecting chamber to the upper end portion of said passageway, means providing a flow path from said stack to the upper end portion of said passageway, means for simultaneously opening one of said flow paths and closing the other, and means for withdrawing gases from the upper end portion of said stack.

4. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, means for cooling the gases in said exhaust stack, means providing a flow path from said exhaust stack to the space below said partition, said flow path having an inlet in said exhaust stack and an inlet in said collecting chamber, means for directing a pressure air stream into said flow path to induce the flow of gaseous products of combustion therethrough, means for simultaneously opening one of said inlets and closing the other to control the flow of the gaseous products of combustion from said collecting chamber and said stack into the flow path and to thereby control the temperature of the air and gases in the space below said partition, and means for withdrawing a portion of the gaseous products of combustion from said exhaust stack.

5. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous product of combustion from the latter, means for cooling the gases in said exhaust stack, a conduit having an outlet opening below said partition and one set of inlet openings in said collecting chamber and a second set of inlet openings in the upper end portion of said stack, means for simultaneously closing one of said sets of inlet openings and opening the other set, means for directing a pressure air stream into said conduit below said one set of inlet openings to entrain gaseous products of combustion through the open one of said sets of inlet openings in said conduit and to deliver said air and said entrained gases to the space below said partition, said opening and closing means acting to vary the temperature of said air and entrained gases by selection of the set of openings through which the gases are entrained, and means for releasing a portion of the gaseous products of combustion from the exhaust stack.

6. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, means for cooling the gases in said exhaust stack, a conduit having an outlet opening below said partition and one set of inlet openings in said collecting chamber and a second set of inlet openings in the upper end portion of said stack, the section of said conduit between the set of inlet openings in said collecting chamber and the outlet opening having converging and diverging portions, means for simultaneously closing one of said sets of inlet openings and opening the other set, means for directing a pressure air stream into the converging portion of said conduit to entrain gaseous products of combustion through the open one of said sets of inlet openings in said conduit and to deliver said air and said entrained gases to the space below said partition, said opening and closing means acting to vary the temperature of said air and entrained gases by selection of the set of openings through which the gases are entrained, and means for releasing a portion of the gaseous products of combustion from the exhaust stack.

7. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, means for cooling the gases in said exhaust stack, a venturi having an inlet in said collecting chamber and an outlet below said partition, means for directing a pressure air stream into the inlet of said venturi to entrain gaseous products of combustion and deliver said air and said entrained gases to the space below said partition, means for directing some of said gaseous products of combustion from said collecting chamber to the inlet of said venturi, means for directing some of said gaseous products of combustion from said stack to the inlet of said venturi, means for simultaneously effecting operation of one of said directing means and preventing operation of the other of said directing means, and means for releasing a portion of the gaseous products of combustion from the exhaust stack.

8. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, means for cooling the gases in said exhaust stack, a venturi having an inlet in said collecting chamber and an outlet below said partition, valve means for regulating the flow of gaseous products of combustion from the stack and from said collecting chamber to said venturi inlet, means for operating said valve means to alternately permit and stop the flow of gases from the stack and from the collecting chamber to the venturi inlet and to thereby control the temperature of the gases delivered to the space below said partition, and means for withdrawing gases from the upper portion of said stack.

9. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, means for cooling the gases in said exhaust stack, a venturi having an inlet in said collecting chamber and an outlet below said partition, valve means for regulating the flow of gaseous products of combustion from the stack and from said collecting chamber to said venturi inlet, control means responsive to changes in the temperature of the air and entrained gases at the outlet of said venturi for operating said valve means to alternately permit and stop the flow of gases from the stack and from the collecting chamber to the venturi inlet, and means for withdrawing gases from the upper portion of said stack.

10. A device of the type described, comprising a housing having a gas collecting chamber therein, a perforated partition mounted in said housing for supporting a fuel bed below said gas collecting chamber and in spaced relationship with the bottom of the housing, an exhaust stack positioned above said collecting chamber to receive the gaseous products of combustion from the latter, means for cooling the gases in said exhaust stack, a venturi having an inlet in said collecting chamber and an outlet below said partition, valve means for regulating the flow of gaseous products of combustion from the stack and from said combustion chamber to said venturi inlet, means providing for manual operation of said valve means to alternately permit and stop the flow of gases from the stack and from the collecting chamber to the venturi inlet and to thereby control the temperature of the gases delivered to the space below said partition, and means for withdrawing gases from the upper portion of said stack.

References Cited in the file of this patent

UNITED STATES PATENTS

| Number | Name | Date |
|---|---|---|
| 440,950 | Kitson | Nov. 18, 1890 |
| 704,527 | Evans et al. | July 15, 1902 |
| 912,373 | Hatton | Feb. 16, 1909 |
| 1,984,665 | Tone | Dec. 18, 1934 |
| 2,085,586 | Hotchkiss | June 29, 1937 |
| 2,278,204 | Lewis | Mar. 31, 1942 |
| 2,301,044 | Heard et al. | Nov. 3, 1942 |
| 2,436,309 | Koebel | Feb. 17, 1948 |
| 2,585,441 | Cornell et al. | Feb. 12, 1952 |
| 2,585,462 | Hirsch | Feb. 12, 1952 |